United States Patent
Feirer et al.

(10) Patent No.: US 11,243,389 B2
(45) Date of Patent: Feb. 8, 2022

(54) OPTICAL SCANNING ARRANGEMENT AND METHOD

(71) Applicant: EUROIMMUN Medizinische Labordiagnostika AG, Luebeck (DE)

(72) Inventors: Christian Feirer, Luebeck (DE); Erik Bernitt, Luebeck (DE); Marc Paul, Luebeck (DE); Rafael Roznowicz, Luebeck (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 357 days.

(21) Appl. No.: 16/604,937

(22) PCT Filed: Apr. 9, 2018

(86) PCT No.: PCT/EP2018/059005
§ 371 (c)(1),
(2) Date: Oct. 11, 2019

(87) PCT Pub. No.: WO2018/197193
PCT Pub. Date: Nov. 1, 2018

(65) Prior Publication Data
US 2020/0379232 A1   Dec. 3, 2020

(30) Foreign Application Priority Data
Apr. 27, 2017 (EP) .................................. 17400019

(51) Int. Cl.
*G02B 21/24* (2006.01)
*G01N 21/64* (2006.01)
(Continued)

(52) U.S. Cl.
CPC ....... *G02B 21/244* (2013.01); *G01N 21/6458* (2013.01); *G02B 21/006* (2013.01);
(Continued)

(58) Field of Classification Search
CPC .................. G02B 21/244; G02B 21/0032; G02B 21/006; G02B 21/0076; G02B 21/26;
(Continued)

(56) References Cited

U.S. PATENT DOCUMENTS

| 10,001,622 | B2 * | 6/2018 | Price | H04N 9/09 |
| 2002/0090127 | A1 * | 7/2002 | Wetzel | G02B 21/0016 382/133 |
| 2009/0195688 | A1 | 8/2009 | Henderson et al. | |

FOREIGN PATENT DOCUMENTS

| EP | 2 990 849 | 3/2016 |
| JP | 2016-173594 | 9/2016 |

(Continued)

OTHER PUBLICATIONS

European Search Report dated Nov. 7, 2017 in European Application No. 17400019.0.

(Continued)

*Primary Examiner* — David P Porta
*Assistant Examiner* — Mamadou Faye
(74) *Attorney, Agent, or Firm* — Grüneberg and Myers PLLC

(57) ABSTRACT

A method is used for optical scanning of at least one object region placed on a transparent specimen holder. The method is as follows: for each sample lateral position of plural predefined sample lateral positions performing a focus determination by: performing laser reflection and using a first camera taking plural first images to determine a reference distance between the specimen holder and an objective lens; performing transmission flash illumination and using a second camera taking plural second images to define a focus distance taking into account the reference distance; after completing the focus determination, determining a focus distance topology across the object region based on the focus distances determined for ail sample lateral positions;

(Continued)

and laterally moving the specimen holder and acquiring third images while focusing according to the focus distance topology.

20 Claims, 7 Drawing Sheets

(51) Int. Cl.
    *G02B 21/00*     (2006.01)
    *G02B 21/26*     (2006.01)

(52) U.S. Cl.
    CPC ..... *G02B 21/0032* (2013.01); *G02B 21/0076* (2013.01); *G02B 21/26* (2013.01); *G01N 2021/6463* (2013.01)

(58) Field of Classification Search
    CPC .. G02B 21/367; G02B 21/242; G02B 21/245; G01N 21/6458; G01N 2021/6463
    See application file for complete search history.

(56) References Cited

FOREIGN PATENT DOCUMENTS

| | | |
|---|---|---|
| WO | 96/01438 | 1/1996 |
| WO | 2004/031830 | 4/2004 |
| WO | 2004/095360 | 11/2004 |
| WO | 2010/055361 | 5/2010 |
| WO | 2010/067256 | 6/2010 |
| WO | 2011/049608 | 4/2011 |

OTHER PUBLICATIONS

International Search Report dated Jul. 6, 2018 in PCT/EP2018/059005.

Written Opinion dated Jul. 6, 2018 in PCT/EP2018/059005.

* cited by examiner (xm, ym, fd)

OPTICAL SCANNING ARRANGEMENT AND METHOD

This application is a National Stage entry under § 371 of International Application No. PCT/EP2018/059005, filed on Apr. 9, 2018, and which claims the benefit to European Application No. 17400019.0, filed on Apr. 27, 2017.

FIELD OF THE INVENTION

The present invention relates to a method and to an arrangement for optical scanning of at least one object region, in particular comprising a histological tissue sample.

PRIOR ART

WO 2004/095360 A1 discloses a method and apparatus for pre-focus in a linear array based slide scanner, wherein focus information is computed prior to scanning microscope slides with a line scan camera. Thereby, the slide is moved to the desired measurement location, the objective lens is moved through a predefined set of height values and imaging data are acquired at each height and the height of the maximum contrast is determined. Further, a ribbon-focus procedure is disclosed, wherein imaging data are acquired continuously, while the slide and objective lens are in motion.

WO 2010/067256 A1 discloses a scanning microscope, wherein a focusing mechanism translates the sample relative to the imaging light spot on a vertical axis. Autofocus optics generate during an autofocus interval a set of autofocus light spots in the sample, the autofocus light spots having different vertical positions. A controller determines from the detector signal a vertical position of an object in the sample and causes the focusing mechanism to adapt the vertical position of the imaging light spot to the vertical position of the object in the sample.

WO 2011/049608 A2 discloses an optical scanning microscope and components for scanning and collecting focused images of a tissue sample. Thereby, the focusing system provides for determining best focus for each snapshot as a snapshot is captured which may be referred to as "on-the-fly focusing".

JP 2016 173594 A discloses a scanning microscope, wherein the focus position of an object is set on a trajectory that interpolates between measured optimum focus settings on selected measurement locations, this procedure being prone to errors and time-consuming thereby limiting the system throughput. The whole slide scanner applies a method, where a tilted autofocus image sensor images an oblique cross-section of the slide. For focusing, multiple sequential overlapping images which have been taken by the tilted sensor are compared. The axial position of the tissue layer can be determined from a polar error signal resulting from this differential measurement.

WO 96/01438 A1 discloses an autofocus system for scanning microscopy in particular applied to fluorescence stained cellular components. The exposure problem of photobleaching during fluorescence microscopy is avoided by using phase-contrast microscopy, implemented through the same optics as fluorescence microscopy. Image planes are scanned over the image object and the images are aligned timewise in a buffer. The image plane having the best focus is selected in a microscope objective is automatically positioned at the selected plane.

WO 2010/055361 A1 discloses a laser scanning microscope for scanning multiple regions of interest. A laser beam is deflected for moving a focus spot of the focused laser beam along a scanning trajectory at an average scanning speed.

It has however been observed that the conventional systems and methods of scanning microscopy have deficiencies in particular regarding measurement time.

Thus, there may be a need for a method and for an arrangement for optical scanning of at least one object region, in particular a tissue sample, such as a histological tissue sample, wherein different focus positions within the object region are accounted for, wherein sharp partial images are enabled to be acquired from the object region and wherein total acquisition time is lower than is conventionally required.

SUMMARY OF THE INVENTION

The need is satisfied by the subject-matter of various embodiments. Particular embodiments of the present invention are specified further below.

According to an embodiment of the present invention it is provided a method for optical scanning of at least one object region placed on a transparent specimen holder. Thereby, the method comprises: for each sample lateral position of plural predefined sample lateral positions performing a focus determination by: performing laser reflection and using a first camera taking plural first images to determine a reference distance between the specimen holder and an objective lens; performing transmission flash illumination and using a second camera taking plural second images to define a focus distance taking into account the reference distance; after completing the focus determination, determining a focus distance topology across the object region based on the focus distances determined for all sample lateral positions; and laterally moving the specimen holder and acquiring third images while focusing according to the focus distance topology.

The object region may for example comprise a (cut) tissue sample, such as a histological sample of a natural organism. The tissue sample may have been treated for example for preserving the tissue sample and/or for staining the tissue sample and/or for adding and/or binding particular components or molecules that enable performing light microscopy or which may have fluorescence dies attached on it, in order to enable performing fluorescence scanning microscopy. The object region may have a lateral extent of for example between 1 cm×1 cm and 2 cm×2 cm and may have a thickness of 1 µm to 10 µm, for example. During the optical scanning, when the third images are acquired, the object region may be illuminated in transmission by for example visible or ultraviolet or infrared light and the traversed visible light may be detected, the traversed visible light substantially having a same wavelength (range) as the light used for illumination. Alternatively or additionally, the object region may be illuminated in transmission by light or in general electromagnetic radiation which excites fluorescence components or molecules comprised in the object region so that fluorescence emission radiation is generated which may be detected as the third images.

The transparent specimen holder may for example comprise a conventional glass plate or glass slide such as a rectangular glass slide. The object region may be covered with for example a cover glass. The object region may be dry or wet.

Previous to performing the focus determination and also previous to performing the actual scanning, the sample lateral positions may have been defined such as to in particular evenly cover the object region (or to cover each of plural object regions arranged on the specimen holder). For example, 3 to 20, further in particular 3 to 10, in particular around 5 predefined sample lateral positions may be used for each object region. The number of predetermined sample lateral positions may depend on the lateral size of the object region, the type of object region and/or pre-treatment of the object region under consideration. For an object region having about a size of 1.5 cm×1.5 cm, five predefined sample lateral positions (e.g. defined by two dimensional coordinates, such as a 2-tuple of numbers) may be sufficient.

The focus determination is, for every sample lateral position of the plural predefined sample lateral positions, a two-step procedure, wherein the first step applies laser reflection and acquiring plural first images using a first camera, while the second step applies transmission microscopy, wherein the plural second images are acquired using a second camera, the second camera being differently configured, in particular being different, from the first camera.

The first camera may in particular be configured to have a lower resolution and/or a smaller field of view than the second camera. During the first step of the focus determination involving the laser reflection, the object region may be illuminated by traversing a laser beam through the objective lens and receiving light, reflected from the object region and having traversed the objective lens, by the first camera. During the second step involving the transmission flash illumination, the object region may be illuminated from below and the transmitted light may traverse the objective lens before being received and detected by the second camera.

The determination of the reference distance (each sample lateral position) as a result of the first step procedure may be relatively fast and the reference distance may serve as a starting point for the second step procedure, in particular as a starting point of the vertical position of the objective lens. The second step procedure may change or adjust the vertical position of the objective lens in a vertical range substantially corresponding or being equal to the (expected maximum) height of the object region. Since the object region may have a height typically between 3 µm and 10 µm, also the second step procedure may be performed in a relatively short time interval. Thereby, for each sample lateral position, the focus distance may be determined in a short time interval.

The first camera may for example have a depth of focus between 0.3 µm and 1 µm, in particular around 0.5 µm. Thus, the laser beam may be reflected in particular from an upper surface of the specimen holder, in a sharp manner only when the vertical position of the objective lens is adjusted such that the laser beam is focused on the upper surface of the specimen holder, with an error less than the depth of focus of the first camera. Thereby, an accurate determination of the vertical position of the (upper surface of the) specimen holder may be enabled in the first step of the focus determination. The second step of the focus determination (for each sample lateral position) may use the reference distance as determined by the first step of the focus determination as a starting value.

Since the sample lateral positions may be laterally farther away from each other than the field of view during the actual scanning for acquiring the third images, also knowledge of focus distances of lateral positions in between the sample lateral position may be required for appropriate focusing during the actual scanning procedure. For this purpose, the focus distance topology is determined which may for example comprise to determine focus distances for plural other lateral positions between and around the sample lateral positions, for example located on a regular mesh having a spacing to be lower than (or substantially equal to) the extent of the field of view during the scanning involving acquiring the third images. In particular, at positions in between or intermediate between two sample lateral positions, the corresponding focus distances may be determined to be in between the focus distances determined for the two sample lateral positions. In particular, a kind of interpolation, extrapolation or curve fitting may be applied to determine the focus distances of lateral positions between sample lateral positions and around sample lateral positions. In particular, it may be taken into account that the object region is expected to be thinner at the outer edges than at the center. In particular, the focus distance topology may comprise one or more convex sub-regions within the object region. Acquiring the third images may be performed using the second camera or an additional third camera. The regions may be calculated based on the macro camera image.

The first step and the second step of the focus determination as well as the scanning for acquiring the third images may be performed using a scanning microscopy system. The recognition of the object region(s) and/or the definition of the sample lateral positions may in contrast be performed using another system, including for example a light table and an overview camera.

According to an embodiment of the present invention, determining the reference distance (for each sample lateral position of the plural predefined sample lateral position) comprises: translating the specimen holder such that the sample lateral position is located in an optical axis of the objective lens above the object region; traversing the objective lens by a laser beam, in particular having wavelength between 600 nm and 900 nm, to illuminate the object region at the sample lateral position; varying a distance between the specimen holder and the objective lens, meanwhile receiving light returning from the object region, in particular comprising reflection form a dichroic filter/reflector, at the first camera (also referred to as fokus camera), to acquire plural first images, in particular comprising between 128× 128 and 32×32 pixel each, in particular applying subsampling; analyzing the first images to detect the reference distance at which the laser beam is substantially focused at and reflected from an upper surface of the specimen holder.

Herein, the specimen holder may be situated on a translation stage allowing to laterally translate the specimen holder (relative to the objective lens) in an x-direction and in an y-direction being e.g. perpendicular to the x-direction. The translation stage may comprise a driving means which may receive control signals from a (central) processor or in particular directly from a processor comprised within the first camera. The laser beam may be directed towards the object region after having traversed the objective lens. For varying the distance between the specimen holder and the objective lens, the specimen holder may keep its vertical position and the objective lens may be vertically moved, in particular by a driving means which may receive control signals from a processor comprised in the first camera or from any other processor of other equipment, such as a computing device. In particular, the distance may be continuously varied, such as by moving the objective lens at a constant velocity in the vertical direction. The laser beam may continuously (e.g. uninterruptedly) illuminate the object region without providing a flash laser beam illumination. The first images may be analyzed using image processing software which may in particular run on a processor included within the first camera. Thereby, the image processing may involve to detect when an edge within the first images is sharpest, the edge being between a (bright) region in the first image into which the laser beam is imaged and a (dark) region into no laser beam is imaged. The first images may not be required to be transferred to a computing device external to the first camera, but may be processed within the first camera by appropriately programming a camera processor. Thereby, the focus determination procedure may be accelerated. The first camera may also control the driving means for the translation stage and/or for vertically moving the objective lens.

According to an embodiment of the present invention varying the distance (between the specimen holder and the objective lens) during the first step of the focus determination comprises: starting at a largest distance (e.g. 10 cm or 1 cm or 3 mm or 1 mm above the object holder) and reducing the distance, wherein in particular between 2000 and 4000 first images per second are acquired, in particular while the objective lens is moving. Varying the distance may further comprise supplying control signals from the first camera to a driving means, in particular comprising a piezo drive, adapted to vertically move the objective lens. The largest distance may correspond to a highest vertical position of the objective lens where the specimen holder is expected to be focussed.

The step of analyzing the first images may further comprise detecting a first reflex of the laser beam at an upper surface of a cover glass covering the object region; detecting a second reflex of the laser beam at a lower surface of the cover glass; detecting a third reflex of the laser beam at the upper surface of the specimen holder; wherein analyzing the first images in particular comprises: using a processor included in the first camera.

When it is started from the largest distance and when the distance (between the specimen holder and the objective lens) is reduced, three events are expected to be encountered: First, the laser beam is expected to be reflected at an upper surface of a cover glass covering the object region and imaged to one of the first images. When the objective lens is moved further down, secondly, a second reflex of the laser beam reflected from a lower surface of the cover glass is expected to be comprised in another of the first images. Finally, a third reflex of the laser beam reflected at the upper surface of the specimen holder is expected to be captured by still another one of the first images. When the first images are analyzed searching for the first reflex, the second reflex and also the third reflex, and when all of these reflexes, i.e. the first reflex, the second reflex and the third reflex are in fact found within subsequent of the first images, the reliability of the detection of the third reflex may be very high. Thus, also the corresponding focus distance at which the third reflex is detected reliably defines the vertical position of the objective lens, where the laser beam is in fact reflected from the upper surface of the specimen holder and imaged in a focused manner.

The step of varying the distance may be stopped, and the receiving the light by the first camera and the acquiring of the first images may be stopped, when the reference distance is found. Thus, for example, as soon as the first reflex, the second reflex and the third reflex are found, the first step of the focus determination may be terminated and the second step of the focus determination may be started, in particular without changing the lateral position, thus staying at the sample lateral position for which the reference distance has been determined using the first step of the focus determination.

During the first step of the focus determination, the reflected laser beam may be reflected from a dichroic mirror which may reflect for example infrared radiation but not visible light. Other configurations are possible.

The following embodiments describe details and particular configurations of the second step of the focus determination.

According to an embodiment of the present invention, performing flash illumination and using the second camera taking the plural second images to define the focus distance, in particular within 500 ms, further in particular within 200 ms, comprises: allowing at least one flash of illumination light traversing the object region at the sample lateral position, then traversing the objective lens and to be incident on the second camera; acquiring the plural second images using the second camera, in particular having a field of view between 0.5 mm×0.5 mm and 1 mm×1 mm, meanwhile decreasing the distance starting from the reference distance by vertically moving the objective lens; determining for each of the second images a degree of sharpness, and defining the focus distance as the distance for which a degree of sharpness is greatest, in particular within 200 ms, further in particular within 100 ms.

To perform the flash illumination may comprise operating a light source in a flash mode and/or operating a light source in a continuous mode and operating a shutter placed in between the light source and the object region. The second camera acquires the second images from which finally the focus distance for the particular sample lateral position is determined. The flash illumination may be performed from below the object region such that the flash of the illumination light passes through the object region and then passes through the objective lens to be detected on the second camera. The first camera as well as the second camera may both take two-dimensional images. However, the second camera may take two-dimensional images having a larger number of pixels than the images taken by the first camera. The first camera and the second camera may comprise different (sizes and/or types) light sensors, in particular having a different number of light sensitive cells. The second camera may also be used for acquiring the third images during the scanning the object region. Determining the degree of sharpness may apply one or more procedures of image processing. The analysis of the second images may be performed by a processor comprised in the second camera or alternatively by an external processor for example of a computing device.

According to an embodiment of the present invention, the flash of illumination light has a duration between 0.5 µs and 20 µs, in particular 1 µs, wherein the flash and/or the acquisition of second images is triggered by a measuring system that measures a vertical position of the objective lens, wherein in particular a vertical interval of the distance between acquired subsequent first and/or second images is between 0.25 µm and 2 µm, in particular 0.5 µm.

When the flash of illumination light has the mentioned duration, the objective lens may be continuously moved while acquiring the second images without leading to blurred second images. When the measuring system which measures the vertical position of the objective lens also triggers the acquisition of the second images and/or the flash of the illumination light, the accurate vertical position of the objective lens to which a particular one of the second images is associated with may be determined. The vertical interval of the distance between acquired subsequent first and/or second images may be selected or adjusted depending on a depth of focus of the optical system comprising the respective camera and the objective lens, such that the inaccuracy of the focus distance determination is not larger or not considerably larger than the depth of focus of the optical system.

According to an embodiment of the present invention, determining for each of the second images the degree of sharpness comprises at least one of: searching the second image having highest contrast; applying an edge detection algorithms such as according to Laplace and/or Sobel; applying difference of Gauss algorithm; applying an image file compression technique. The method may in particular further comprise; not illuminating the object region with the laser beam while taking the second images, after taking the first images. Which of these procedures to determine the degree of sharpness is used may depend on whether light scanning microscopy or fluorescence scanning microscopy is applied or may also depend on the object region, in particular the staining and/or pre-treatment and other factors.

According to an embodiment of the present invention, determining the focus distance topology comprises: calculating focus distances at mesh positions of a lateral two dimensional mesh covering the object region based on the determined focus distances at the sample lateral positions, the lateral two-dimensional mesh in particular having been determined before taking the first images and second images. The mesh position may correspond or be (substantially) equal to the lateral positions for which the third images are finally taken during the scanning. Thus, advantageously, the lateral positions at which the third images are taken may be acquired in a focused manner.

According to an embodiment of the present invention, determining the focus distance topology further comprises: subdividing, based on the focus distances determined for the sample lateral positions, the object region in subregions being essentially convex; and/or determining at least one convex envelope comprising sample lateral positions which focus distances lie on a convex surface; applying a smoothing operation.

In each subregion, the focus distances may be smallest in the center and may be greater towards the boundary of the subregion. Thus, between subregions, the focus distances may have relatively greater values than in the center of the subregions. For example, a tissue sample may be torn in particular areas, such that in these areas, substantially no tissue is present. These areas may be identified as borders between subregions. Thereby, the determination of the focus topology may be improved.

The following embodiments describe details of particular steps which may be applied during the actual scanning of the object region.

According to an embodiment of the present invention, the scanning includes for all mesh positions starting from a start (lateral) scan position: translating, in particular in meander shape, the specimen holder laterally such that a current mesh position is in the optical axis of the objective lens; meanwhile moving the objective lens to be at the mesh focus distance associated with the present mesh position; acquiring one of the third images by a third camera (or the second camera), in particular while performing flash illumination having a duration between 0.5 µs and 20 µs, in particular 1 µs. The flash illumination may in particular be adapted to excite (or not to excite) fluorescence in the object region, wherein fluorescence emission radiation emanating from the object region may detected by the third (or second) camera.

The third images may be acquired while the specimen holder is translating with constant speed and/or while the objective lens is moved towards the corresponding mesh focus distance. This may be enabled by the short duration of the flash illumination, without causing blurred third images.

According to an embodiment of the present invention, a velocity of the specimen holder during the scanning, adjusting the vertical position of the objective lens and acquiring the third images is between 5 mm/s and 30 mm/s, in particular between 10 mm/s and 20 mm/s. Thereby, completing scanning the object region and in particular completing scanning of plural object regions on the specimen holder may be achieved in a short time interval.

The following embodiments describe method steps which may be performed prior to the focus determination and prior to the scanning itself.

According to an embodiment of the present invention, the method further comprises before taking the first and second images: in transmitted illumination mode, acquiring an optical overview image, in particular using an overview camera having a focal length between 5 mm and 10 mm, having a working distance of between 50 mm and 150 mm, of at least a portion of the specimen holder; analyzing the overview image to determine a lateral localization of the at least one object region; defining the plural, in particular at least five, sample lateral positions for focusing within the determined object region such that they are distributed across essentially the whole object region, in particular evenly; in particular defining, based on the localization of the object region, mesh positions of a lateral two dimensional mesh, at which later the third images are acquired.

The overview camera may have a different configuration than the first camera and also the second camera and also the third camera, if present. The overview camera may be adapted to acquire a macro image imaging in particular the entire specimen holder on which plural object regions are placed. Thus, the overview image may for example image an area in reality of between 5 cm×20 cm and 2 cm×10 cm, for example. The lateral localization of the at least one object region may comprise determination of (coordinates of) a lateral border of the object region or determination of (coordinates of) mesh lateral positions which are within the object region. The sample lateral positions may be substantially evenly distributed (e.g. such that relative lateral distances are similar) across each of the identified object regions. The determination of the lateral localization of the object regions may be achieved by applying image processing, in particular including object recognition software methodologies. The recognition methods applied may depend on the staining, the pre-treatment of the tissue samples and also the kind of the tissue samples.

According to an embodiment of the present invention, defining the plural sample lateral positions is performed in an overview coordinate system, associated with an overview camera mounted above a diffusely illuminated area, in particular a light table, on which the specimen holder is placed, wherein the light table in particular comprises at least two light source (e.g. LED) stripes laterally attached to an acrylic glass above which a diffusing element and a clear acrylic glass is arranged, the specimen holder being placed onto the clear acrylic glass, wherein positions of the overview coordinate system are transformed into a microscopy coordinate system for taking the first, the second and the third images.

The light table may homogeneously illuminate the entire specimen holder from below. Thereby, the specimen holder may be arrangeable relative to the overview camera (and/or relative to the light table) in a defined lateral position which may enable to transform the positions of the overview coordinate system to positions of the microscopy coordinate system.

According to an embodiment of the present invention, the first camera and second camera are configured for different images format and/or sampling and/or subsampling and/or resolution, wherein the configuration of the first camera and the second camera is kept fixed during the method. In particular, the second camera may be configured to have a lower resolution than the first camera and/or having a smaller field of view than the first camera. Thus, determining the reference distance may be achieved in a relatively short time interval.

It should be understood that features, individually or in any combination, disclosed for a method for optical scanning of at least one object region may also be applied, individually or in any combination, to an arrangement for optical scanning of at least one object region according to embodiments of the present invention and vice versa.

According to an embodiment of the present invention it is provided an arrangement for optical scanning of at least one object region placed on a transparent specimen holder, the arrangement comprising: a laser generating a laser beam; a first camera, a second camera, the laser, the first camera being configured to acquire plural first images of the laser beam reflected from each sample lateral position of plural predefined sample lateral positions, to determine a reference distance between the specimen holder and an objective lens; the second camera being configured to taking, each sample lateral position, plural second images upon transmission flash illumination, to define a focus distance; a processor adapted to determine a focus distance topology across the object region based on the focus distances determined for all sample lateral positions, the arrangement in particular further comprising: a drive means for vertically moving the objective lens; and a translation stage adapted to laterally move the specimen holder while acquiring third images and focusing according to the focus distance topology using the drive means.

Furthermore, the arrangement may comprise a light table and an overview camera which may be configured to implement an embodiment of the method as described above. Furthermore, the arrangement may comprise a data processing apparatus, such as a computing device which may have loaded therein an image processing software. Furthermore, the computing device or data processing device may comprise a processor which may provide control signals to driving means of the objective lens and/or a translation stage.

SHORT DESCRIPTION OF THE DRAWING

FIG. 1 schematically illustrates an arrangement for optical scanning of at least one object region according to an embodiment of the present invention in a cross-sectional side view;

FIG. 2 schematically illustrates an arrangement for optical scanning according to an embodiment of the present invention in a perspective view;

FIG. 3 schematically illustrates a light table which may be comprised in an arrangement according to an embodiment of the present invention;

DETAILED DESCRIPTION OF EMBODIMENTS

Figure 1:
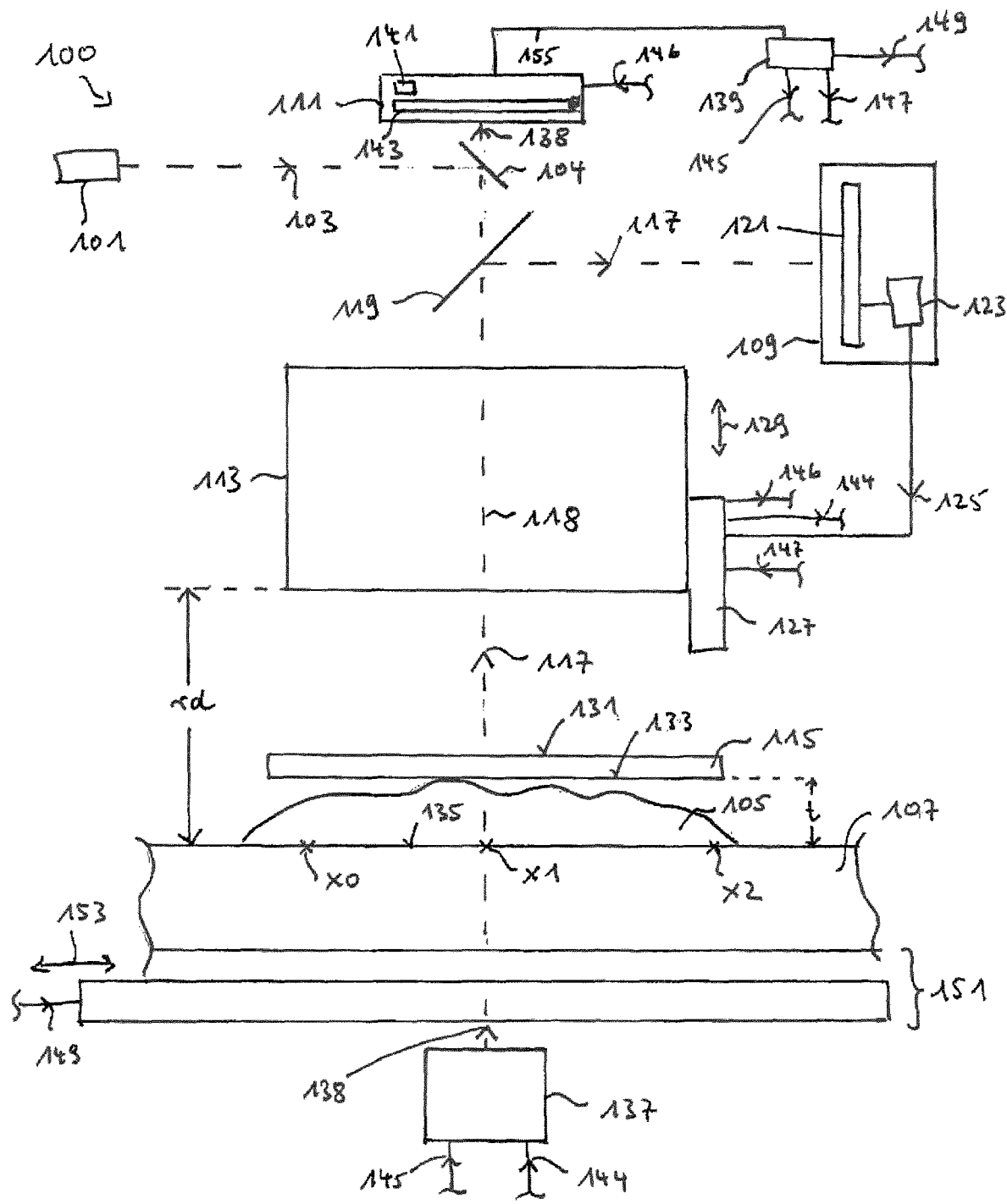

The arrangement 100 schematically illustrated in FIG. 1 in a cross-sectional side view is adapted to carry out a method for optical scanning at least one object region 105 placed on a transparent specimen holder 107 according to an embodiment of the present invention. The arrangement 100 is adapted in particular to perform a first step of a focus determination and a second step of a focus determination.

Therefore, the arrangement 100 comprises a laser 101 for generating a laser beam 103. The arrangement 100 further comprises a first camera 109 and a second camera 111. During the focus determination, for each sample lateral position x0, x1, x2 (per object region for example 5 sample lateral positions), the focus determination is carried out involving two steps at each sample lateral position. In the first step of the focus determination, the laser beam 103 is reflected at reflector 104, traverses the objective lens 113 and impinges onto a location (in the optical axis 118 of the objective lens 113) of the object region 105 after traversing the objective lens 113 and traversing the cover glass 115. The laser beam 117 being reflected is reflected by a dichroic filter/reflector 119 and is incident on the first camera 109 comprising (non illustrated optics and) a spatially resolving light sensitive device 121 and further comprising a processor 123 which receives measurement results of the spatially resolving light sensitive device 121. The processor 123 of the first camera is adapted to supply control signals 125 to a drive means 127 which is adapted to adjust a vertical position of the objective lens 113 in the vertical direction 129.

In particular, at the beginning of the first procedure of the focus determination, the objective lens 113 is positioned at a largest (or predefined) distance between the specimen holder 107 and the objective lens 113. Then, the objective lens 113 is moved downwards towards the specimen holder 107, the laser beam 103 continuously illuminates a location of the object region 105 and the reflected laser light 117 is received by the first camera which acquires a plurality of first images. Each of the acquired first images is then analyzed by the processor 123 comprised in the first camera 109 in order to detect characteristic features in the first images. In particular, the processor 123 comprises image processing software to detect a first reflex of the laser beam 103 which is caused by a reflection of the laser beam 103 at an upper surface 131 of the cover glass 115 covering the object region 105 (which may comprise a tissue sample). The objective lens 113 is then lowered further and further first images are acquired and one of the first images will comprise an imaged second reflex of the laser beam which originated from a reflection at a lower surface 133 of the cover glass 115. The objective lens 113 is further lowered until a third reflex of the laser beam is detected which third reflex originates from a reflection of the laser beam 103 from the upper surface 135 of the specimen holder 107.

In the illustration of FIG. 1, the objective lens 113 is in the vertical position in which the laser beam 103 is focused at the upper surface 135 of the specimen holder 107, wherein the distance rd between the objective lens 113 and the upper surface 135 of the specimen holder 107 represents a reference distance which is a starting position for the second step of the focus determination of the current sample lateral position x1.

For the second step of the focus determination the laser 101 may be switched off and a flash illumination light source 137 may be operated to generate flash illumination light 138 traversing from below the object region 105. The flash illumination light source 137 may for example comprise a controllable shutter which is placed downstream a continuously emitting light source. The main processor 139 which may also be comprised within the arrangement 100 may control the flash illumination light source 137 and/or may also control the second camera 111, and/or the translation stage and/or the driving means 127. Starting from the reference distance rd between the objective lens 113 and the specimen holder 107, the objective lens 113 is then in a stepwise manner or in a continuous manner having constant velocity moved upwards, thus the distance between the objective lens 113 and the specimen holder 107 is increased while performing transmission flash illumination and using the second camera 111 to take plural second images.

The second images may be processed by a processor 141 comprised in the second camera 111 (which also comprises a spatially resolving light detection device 143) or by the main processor 139. In particular, the main processor 139 may provide control signals 145 to the flash illumination light source 137, may provide control signals 147 to the drive means 127 and also may supply control signals 149 to the translation stage 151 on which the specimen holder 107 is arranged in order to laterally translate the specimen holder 107 in the lateral direction 153 (and additional in a lateral direction perpendicular to the direction 153 and perpendicular to the vertical direction 129). Further, the processor 139 may communicate with the second camera 111 via a control line 155. The processor 139 may also be employed during the actual scanning, in order to control the illumination light source 137, the translation stage 151, the vertical driving means 127 and also the second camera 111.

The plural second images acquired by the second camera 111 are then analyzed regarding a degree of sharpness and the second image associated with the highest sharpness is determined. The distance between the objective lens 113 and the specimen holder 107 at which the second image has highest sharpness is considered to be the focus distance at which the object region 105 is imaged in a focussed manner at the current sample lateral position x1.

In a same manner, focus determinations are performed for all other sample lateral positions x0, x2, . . . across the object region 105.

Then a focus topology is calculated and the object region is scanned using the focus topology for moving the objective lens in the appropriate vertical positions.

Figure 2:
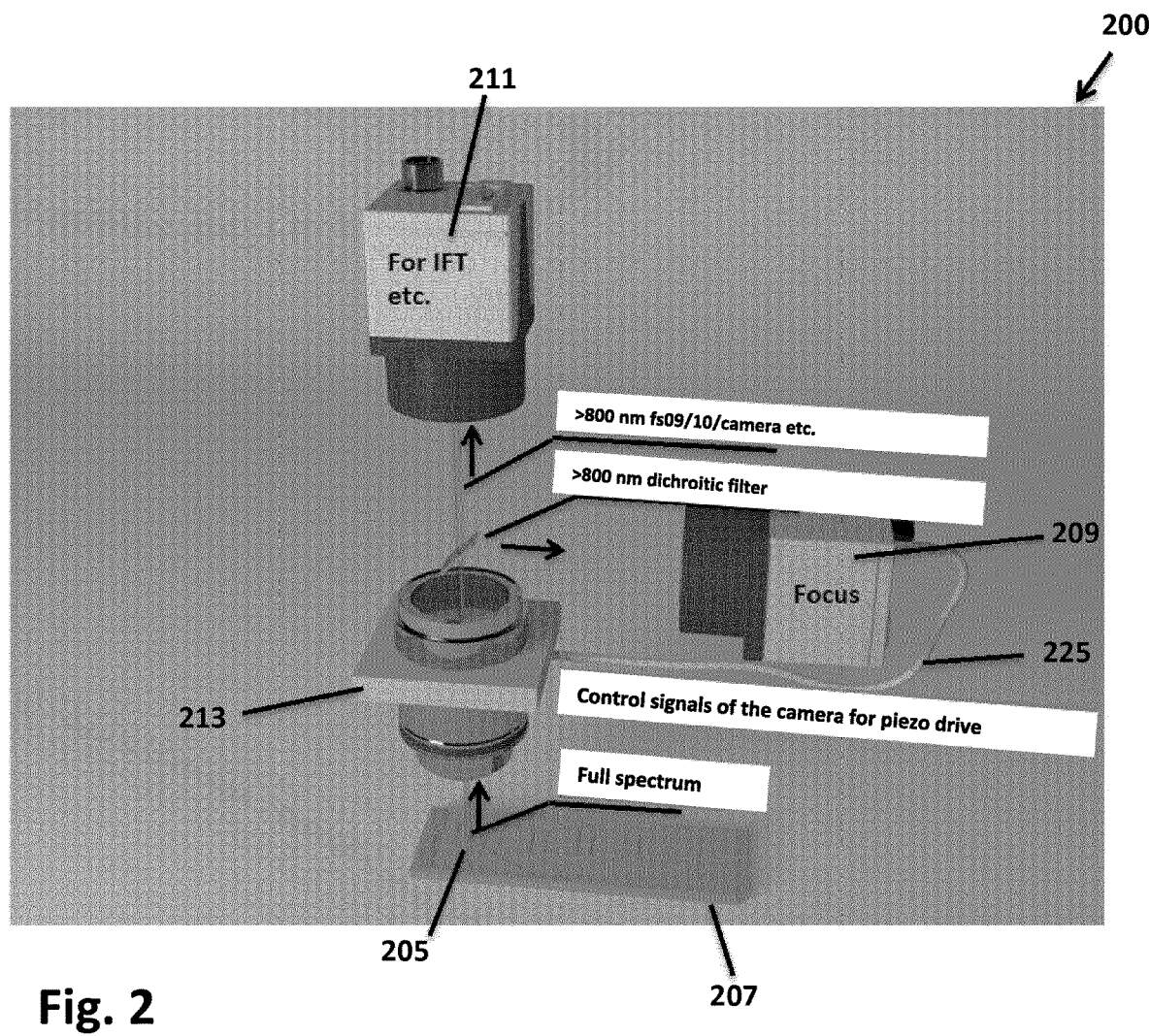

FIG. 2 illustrates an arrangement 200 for optical scanning of at least one object region according to another embodiment of the present invention in a perspective view. The arrangement 200 also comprises a first camera 209 and a second camera 211, an objective lens 213, and a translation stage 251 at which the specimen holder 207 is placed. Further, the arrangement 200 comprises a not illustrated laser and a processor.

The arrangements 100, 200 increase the degree of automization for processing and diagnosing histological samples. Further, they support telepathology. The arrangements provide accelerated electronic processing and enable a focusing method with a convex envelope.

Figure 3:
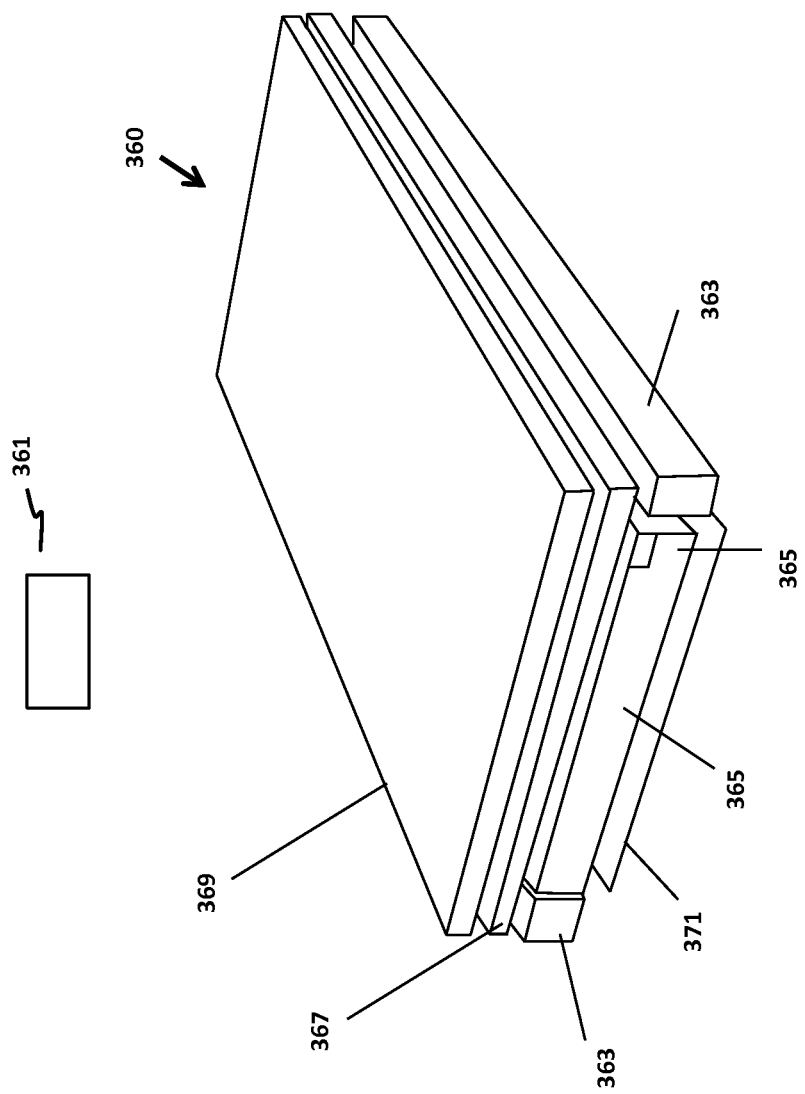

FIG. 3 schematically illustrates a light table 360 which may be utilized in a scanning method according to an embodiment of the present invention and may be comprised in an arrangement according to an embodiment of the present invention. Above the light table 360, an overview camera 361 is placed in order to acquire an overview image of an entire specimen holder having placed thereon several object regions. The light table 360 comprises LED stripes 363 being laterally attached to an acrylic glass 365 above which a diffusing element 367 and a clear acrylic glass 369 is arranged. Below the clear plexiglass 365, a white sheet 371 is arranged. The light table 360 enables to diffusely illuminate an object holder which is placeable on top of the clear plexiglass 369 for acquiring an overview image using the overview camera 361. In particular, the light table 360 generates a homogeneous illumination light. The overview camera 361 may have a focus length of 6 mm and may have a working distance of around 100 mm.

Figure 4:
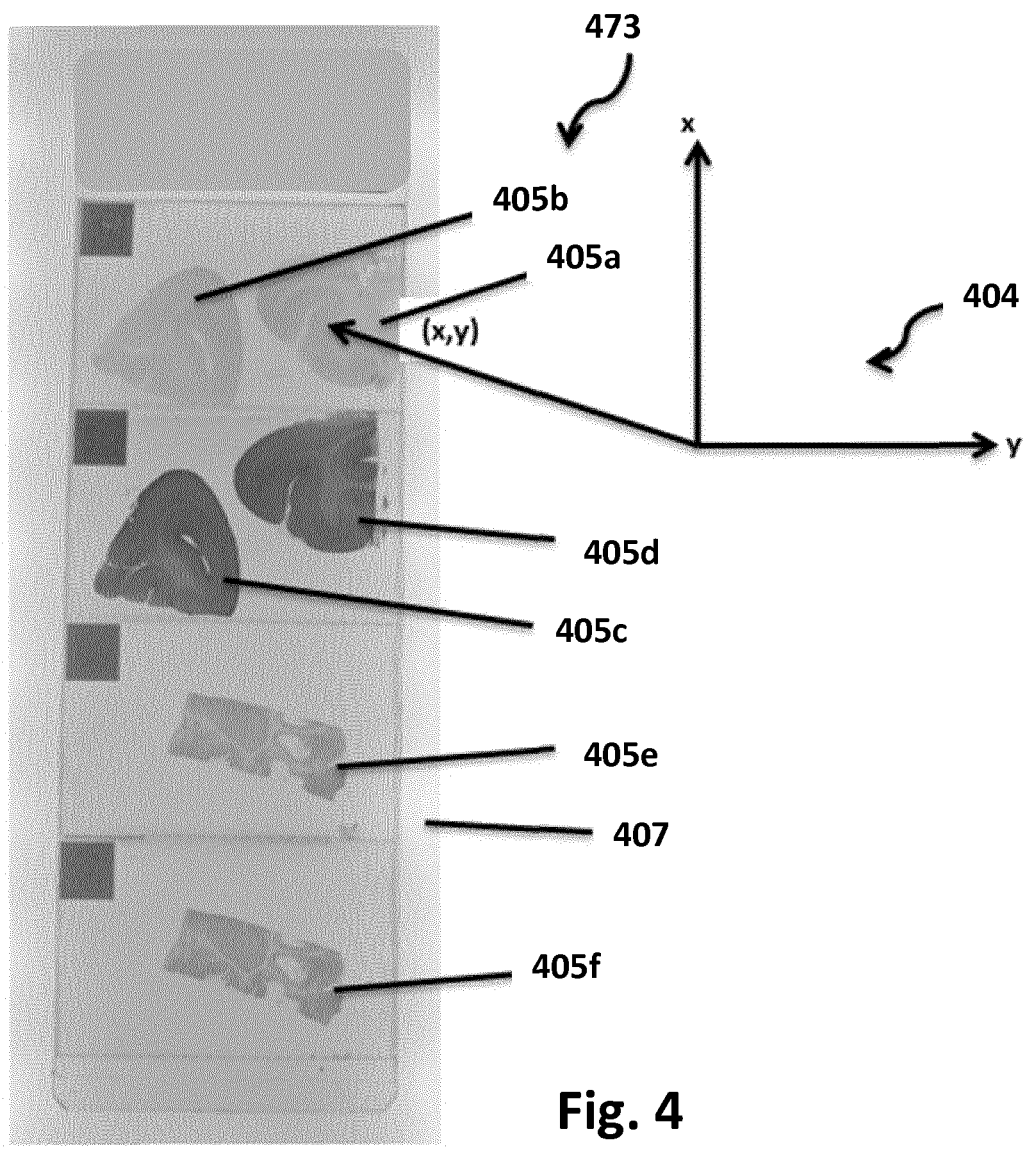
FIG. 4 illustrates an overview image as taken during a method for optical scanning according to an embodiment of the present invention.

The overview image 473 taken by the overview camera 361 is illustrated in FIG. 4. The overview image 473 comprises the whole specimen holder 407 having placed thereon plural object regions 405a,b,c,d,e,f. The overview image 473 is analyzed to determine the localizations (e.g. center position (x,y) and boundary lines in overview coordinate system 404) of the several object regions 405a, . . . f. For generating the overview image 473 illustrated in FIG. 4, the light table 360 and the overview camera 361 have been used, thereby illuminating the specimen holder from below. Additionally, the specimen holder may be illuminated from above to detect data codes or other identification information identifying the different object regions 405a, . . . f. The identification information is then associated with the respective overview image of the respective object region. The determined localizations of the object regions may be described by coordinates covering the respective object region. At this stage, a two-dimensional lateral (equidistant) mesh may be defined, which is adapted to the used objective lens (20× objective lens with ⅔" 0.63× adapter) having a field of view of e.g. 0.6 mm×0.6 mm.

Figure 5:
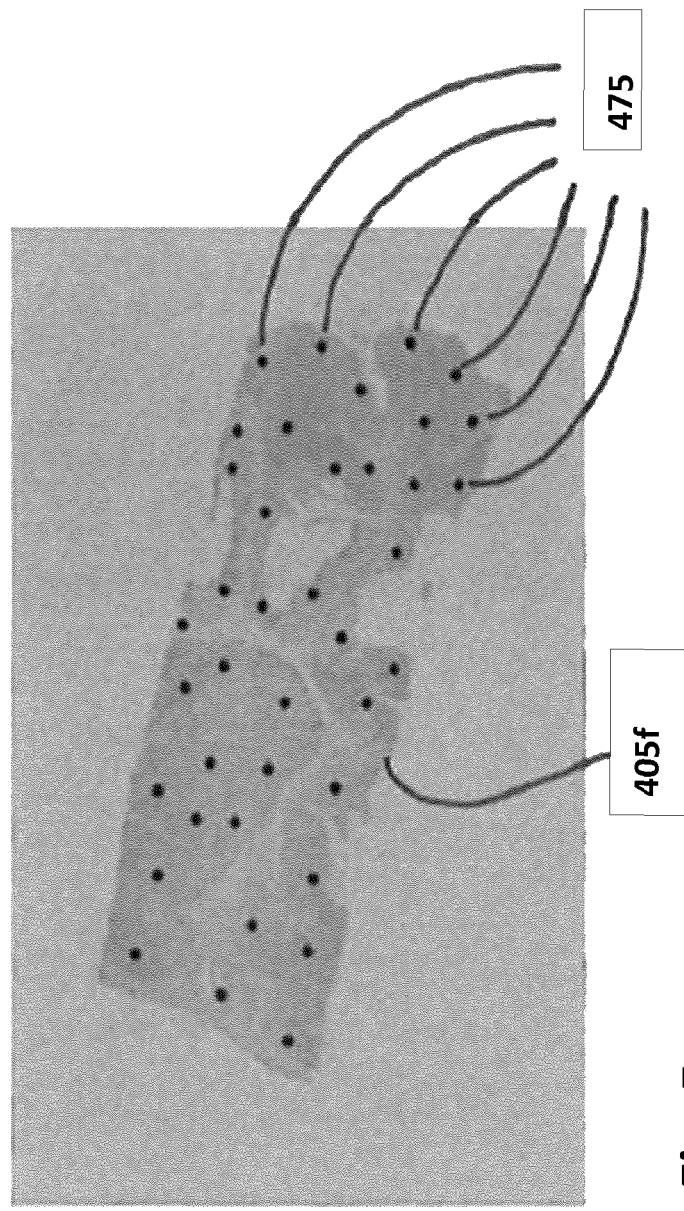
FIG. 5 illustrates an object region with sample lateral positions as used within a scanning method according to an embodiment of the present invention.

Furthermore, from the overview image 473, plural sample lateral positions 475 are defined in each object region such as to essentially evenly cover the respective object region 405f, as is illustrated in FIG. 5.

Then, the specimen holder 407 is withdrawn from the light table 360 and is placed onto the translation stage 151 of the arrangement 100, as is illustrated in FIG. 1. The translation stage 151 allows translating the specimen holder 107 in two perpendicular directions. The coordinates or localizations of the object regions 405a, . . . f are transformed into a coordinate system of the translation stage 151. Thus, the sample lateral positions 475 are known as coordinates in the coordinate system of the translation stage 151 and are labelled in FIG. 1 as x0, x1, x2.

A focusing procedure for determining a focus distance for each of the sample lateral positions consists of two parts.

The first part includes to finding the vertical position of the surface of the specimen holder. Thereby, a laser beam, preferably >800 nm, is used which does not harm or damage the object region. The laser beam is traversed through the objective lens 113 towards the specimen holder 107. The reflection light 117 of the laser 101 is not allowed to impinge onto the second camera 111, but is coupled using the dichroic filter 119 towards the first camera 109 which is provided especially for the focus determination. This first camera 109 performs the image processing and also provides the control signals 125 for the vertical drive means 127. The first camera 109 is adapted to achieve a processing speed of 3250 images per second. At the first part of the focus determination, the objective lens 113 starts at the maximal distance to the specimen holder 107. The objective lens 113 then approaches in 0.5 µm steps towards the specimen holder 107. At each step, a first image is acquired by the first camera 109 and is analyzed with respect to a characteristic laser reflection. The light point (originating from reflection of the laser beam) is visible in its full intensity and degree of details only within the depth of focus of the objective lens 113. The first reflection arises at the entry of the cover glass 115. The second reflection arises at the exit of the cover glass 115. The third reflection corresponds to the entry into the specimen holder 107. Thereby, a reference distance is found.

During the second part of the focus determination, the laser 101 is shut off. At each vertical position of the objective lens 113 (starting at the reference distance and moving upwards), a transmission condenser with a particular flash controller is operated for a duration of 10 µs. The flash current and the camera trigger are synchronized by a vertical measurement system which is also comprised in the vertical drive means 127. Thus, the vertical drive and measurement system 127 provide a control signal 144 to the flash illumination light source 137 (in particular to a condenser comprised therein) and also supplies a control signal 146 to the second camera 111, in order to synchronize them. The second images are acquired, while the objective lens 113 is in motion. Starting from the reference distance rd, at which the laser beam 103 was focused at the upper surface 135 of the specimen holder 107, the second camera 111 (also referred to as photo camera) acquired plural second images such that two subsequent second images are associated with vertical positions of the objective lens being 0.5 µm spaced apart. It is continued, until the objective lens has moved upwards corresponding to the thickness t of the tissue, i.e. the object region 105. The thickness may for example be between 4 and 6 µm. When using light microscopy, the degree of sharpness is used by the Sobel methodology (sum, abs, 3×3).

The Sobel operator, sometimes called the Sobel-Feldman operator or Sobel filter, is used in image processing and computer vision within edge detection algorithms where it creates an image emphasising edges. "Isotropic 3×3 Image Gradient Operator" is a discrete differentiation operator, computing an approximation of the gradient of the image intensity function. At each point in the image, the result of the Sobel-Feldman operator is either the corresponding gradient vector or the norm of this vector. The Sobel-Feldman operator is based on convolving the image with a small, separable, and integer-valued filter in the horizontal and vertical directions and is therefore relatively inexpensive in terms of computations. The operator uses two 3×3 kernels which are convolved with the original image to calculate approximations of the derivatives—one for horizontal changes, and one for vertical. If we define A as the source image, and Gx and Gy are two images which at each point contain the horizontal and vertical derivative approximations respectively, the computations may be as follows:

$$I^*(x, y) = \sum_{i=1}^{n} \sum_{j=1}^{n} I(x+i-a, y+j-a)k(i, j)$$

$$G_x = S_x * A = \begin{bmatrix} 1 & 0 & -1 \\ 2 & 0 & -2 \\ 1 & 0 & -1 \end{bmatrix} * A$$

$$G_y = S_y * A = \begin{bmatrix} 1 & 2 & 1 \\ 0 & 0 & 0 \\ -1 & -2 & -1 \end{bmatrix} * A$$

"I" is the Intensity of a pixel at (x,y). All pixel intensities of an image have to be added. That is the value of a Sobel-Filtered Image that describes the strength of edges. "sum, abs, 3×3" means, all values are added, negative matrix results are not allowed, matrix size (kernelsize) is 3×3.

When using fluorescence microscopy, either the difference of Gauss method or a JPEG focus method (compression to 100%) is performed.

Difference of Gauss method also applies the formula:

$$I^*(x, y) = \sum_{i=1}^{n} \sum_{j=1}^{n} I(x+i-a, y+j-a)k(i, j)$$

thus, the same basic formula as used for the Sobel-algorithm. It is also a convolution. The non-separated matrix is e.g. a 3×3 matrix, for example a classic Gauss-bell (3×3 matrix):

1-2-1
2-4-2
1-2-1

An example of a 5×5 matrix, which may be used for problematic images, is:

| $\frac{1}{273}$ | 1 | 4 | 7 | 4 | 1 |
|---|---|---|---|---|---|
| | 4 | 16 | 26 | 16 | 4 |
| | 7 | 26 | 41 | 26 | 7 |
| | 4 | 16 | 26 | 16 | 4 |
| | 1 | 4 | 7 | 4 | 1 |

The difference of Gauss-method may work as follows:

From an image the added values are calculated with the described formulas, to obtain a first value. On the gaussed image, you again calculate the gauss value, to obtain a second value. The difference of these two values describes the sharpness in a very solid way, even for problematic images, where standards like Sobel-method will fail. Its problem is that it consumes a lot of calculation power. Because of that it is only used, if necessary.

The JPEG Focus method may work as follows:

From an image a jpeg compression is calculated with max quality settings. The total byte size of this compressed image describes not only the "size", but also the sharpness. If two images with the absolute same content, but one image is less sharp, than the sharper image always have the bigger byte size. If the step size of a focus batch is greater than depth of field, the JPEG focus method may in particular be applied.

To determine the focus distance on average less than 100 ms are required.

A mesh object is created whose polygons contain the coordinates of the focal point (xyz). The mesh object is smoothed and subdivided, in an improved manner to determine the topology of the intermediate regions.

Figure 6:
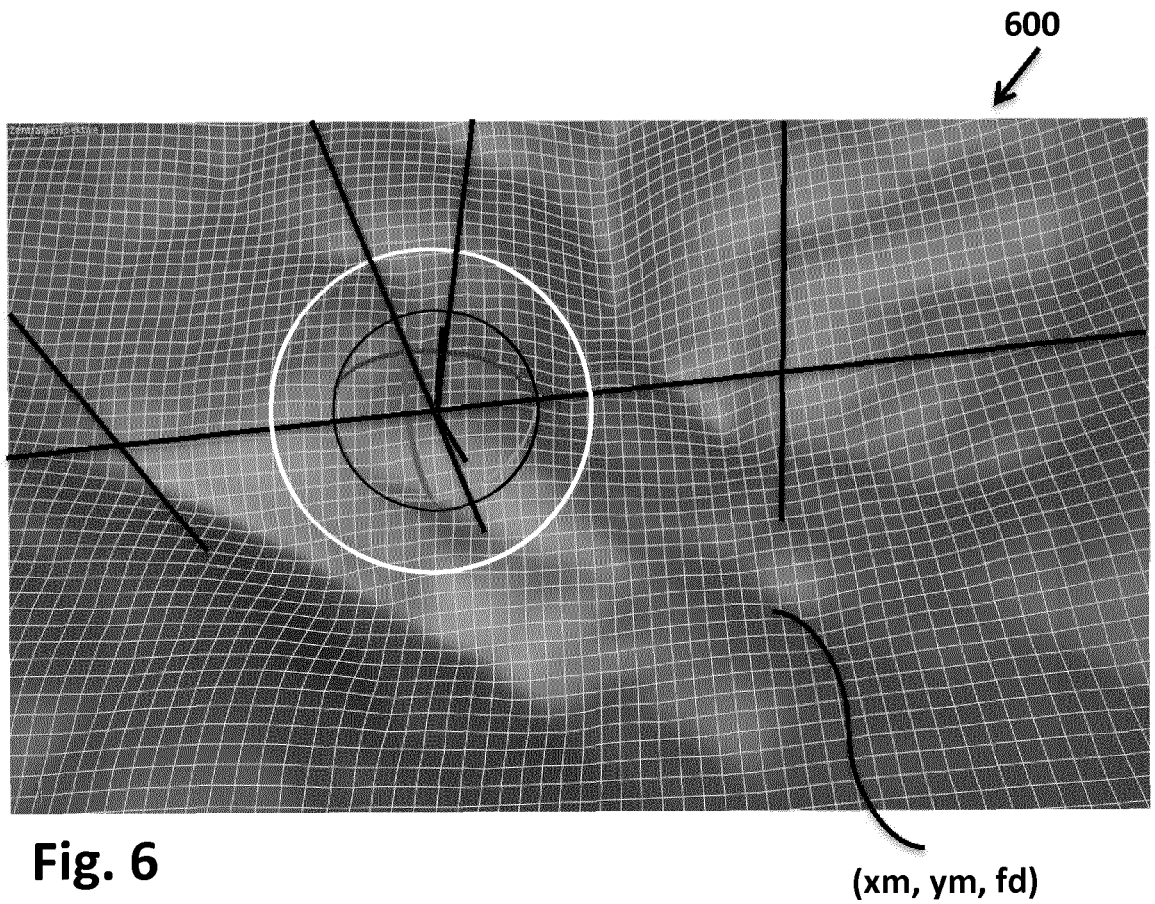
FIG. 6 illustrates in an example of a focus distance topology as smoothed according to an embodiment of the present invention.
Figure 7:
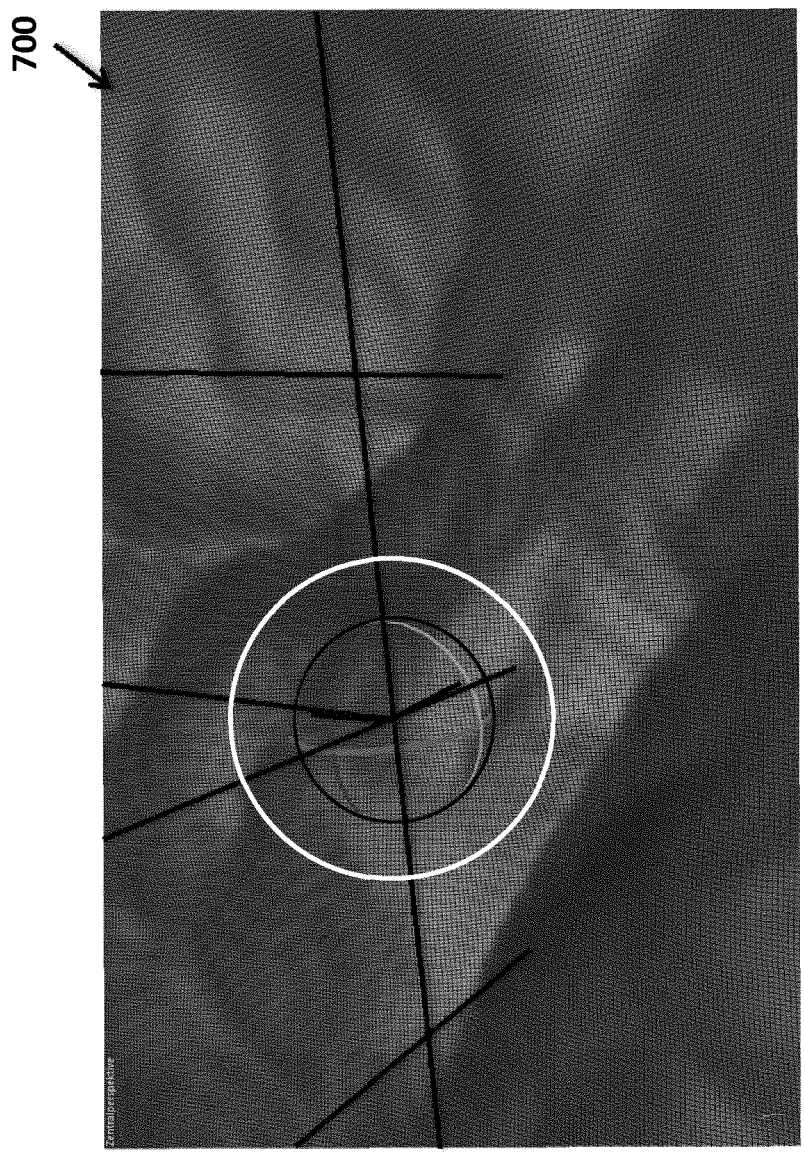
FIG. 7 illustrates an example of a focus distance topology smoothed and subdivided according to an embodiment of the present invention.

FIG. 6 illustrates a smoothed focus topology 600, wherein the focus topology assigns at each mesh lateral position (xm, ym) a focus distance fd. The focus topology (xm, ym, fd) 600 is calculated based on the focus distances determined for the plural sample lateral positions. FIG. 7 illustrates a focus topology 700 derived from the focus topology 600 after subdividing it.

When the focus topology has been determined for the object region 105, the actual scanning can be performed. Thereby, the translation stage 151 moves the object region 105 in a meander manner, while the objective lens 113 is adjusted according to the determined focus topology and third images are acquired while moving the translation stage 151 and moving the objective lens 113 as needed. Thereby, the flash illumination light source 137 may for example provide flashes of 10 µs while the translation stage 151 moves with 14 mm/s.

Since during the first part of the focus determination the upper surface of the specimen holder is detected, no markers are necessary. During the focusing, only the objective lens but not the translation stage is moved, thereby reducing the moved mass.

The objective lens may be moved using a piezo drive enabling to achieve an accuracy in the nm range. The third images may be stitched together in real-time.

To use two different cameras, i.e. the first camera and the second camera to perform the focus determination has several advantages:

A particular camera always has a dead time (depending on the switching, depending on the sensor type and the application programming interface of the camera up to one full second), if its parameters of the format of the image are changed, for example, binning or subsampling. Since the camera for the laser focus needs to be operated at a smaller resolution (than the camera used for the scanning), in order to achieve the high repetition rate of about 3000 images per second, it would be required, if only one camera would be available, to change the format of the camera. Thereby, the method would be very time-consuming. In the method according to embodiments of the present invention, however, the configurations (in particular regarding format and/or resolution) of the first camera as well as the second camera do not need to be changed regarding the resolution (format) thereby avoiding dead times.

Furthermore, when the laser provides an infrared laser beam, damage of the biological sample may be reduced. The objective lens may be a 20 objective lens having a numerical aperture of 0.8.

The invention is not limited to the described or illustrated embodiments.

The invention claimed is:

1. A method for optical scanning of at least one object region placed on a transparent specimen holder, the method comprising:
   for each sample lateral position of plural predefined sample lateral positions, performing a focus determination by:
      performing laser reflection and, using a first camera, taking plural first images to determine a reference distance between the specimen holder and an objective lens at which reference distance a laser beam is substantially focused at and reflected from an upper surface of the specimen holder,
      wherein the determination of the reference distance comprises analyzing the plural first images, wherein the analyzing the plural first images comprises:
         detecting a first reflex of the laser beam at an upper surface of a cover glass covering the at least one object region,
         detecting a second reflex of the laser beam at a lower surface of the cover glass, and
         detecting a third reflex of the laser beam at the upper surface of the specimen holder;
      performing transmission flash illumination and, using a second camera, taking plural second images to define a focus distance, taking into account the reference distance;
   after completing the focus determination, determining a focus distance topology across the at least one object region based on the focus distances determined for all the plural predefined sample lateral positions; and
   laterally moving the specimen holder and acquiring third images while focusing according to the focus distance topology.

2. The method according to claim 1 wherein determining the reference distance comprises:
   translating the specimen holder such that at least one sample lateral position of the plural predefined sample lateral positions the sample lateral position is located in an optical axis of the objective lens above the object region;
   traversing the objective lens by a laser beam to illuminate the object region at the at least one sample lateral position;
   varying a distance between the specimen holder and the objective lens, meanwhile receiving light returning from the object region, at the first camera, to acquire the plural first images; and
   analyzing the plural first images to detect the reference distance at which the laser beam is substantially focused at and reflected from the upper surface of the specimen holder.

3. The method according to claim 2, wherein varying the distance comprises:
   starting at a largest distance and reducing the distance.

4. The method according to claim 2, wherein the plural first images are analyzed by a processor included in the first camera.

5. The method according to claim 1, wherein performing flash illumination and, using the second camera, taking the plural second images to define the focus distance comprises:
   allowing at least one flash of illumination light traversing the object region at the at least one sample lateral position, then traversing the objective lens and to be incident on the second camera;
   acquiring the plural second images using the second camera meanwhile decreasing the distance starting from the reference distance by vertically moving the objective lens;
   determining, for each of the plural second images, a degree of sharpness, and
   defining the focus distance as the distance for which the degree of sharpness is greatest.

6. The method according to claim 5,
   wherein the at least one flash of illumination light has a duration between 0.5 µs and 20 µs, wherein the flash and/or the acquisition of the plural second images is triggered by a measuring system that measures a vertical position of the objective lens.

7. The method according to claim 5, wherein determining for each of the plural second images the degree of sharpness comprises at least one selected from the group consisting of:

searching the second image having highest contrast;
applying Sobel algorithm;
applying difference of Gauss algorithm; and
applying an image file compression technique.

8. The method according to claim 1, wherein determining the focus distance topology comprises:
   calculating focus distances at mesh positions of a lateral two dimensional mesh covering the object region based on the focus distances at the plural predefined sample lateral positions.

9. The method according to claim 8, wherein determining the focus distance topology further comprises:
   subdividing, based on the focus distances determined for the plural predefined sample lateral positions, the object region in subregions being essentially convex; and/or
   determining at least one convex envelope comprising at least one of the plural predefined sample lateral positions which focus distances lie on a convex surface; and
   applying a smoothing operation.

10. The method according to claim 8, wherein optical scanning includes, for all mesh positions, starting from a start scan position:
    translating the specimen holder laterally such that a current mesh position is in the optical axis of the objective lens;
    meanwhile moving the objective lens to be at the focus distance associated with the current mesh position;
    acquiring at least one of the third images by a third camera.

11. The method according claim 1, wherein a velocity of the specimen holder during the scanning, adjusting the vertical position of the objective lens and acquiring the third images is between 5 mm/s and 30 mm/s.

12. The method according to claim 1, further comprising, before taking the plural first images and the plural second images:
    in a transmitted illumination mode, acquiring an optical overview image of at least a portion of the specimen holder;
    analyzing the optical overview image to determine a lateral localization of the at least one object region;
    defining the plural sample lateral positions for focusing within the determined object region such that they are distributed across essentially the whole object region.

13. The method according to claim 12,
    wherein defining the plural sample lateral positions is performed in an overview coordinate system, associated with an overview camera mounted above a diffusely illuminated area, on which the specimen holder is placed,
    wherein positions of the overview coordinate system are transformed into a microscopy coordinate system for taking the plural first images, the plural second images, and the third images.

14. The method according to claim 1, wherein the first camera and the second camera are configured for different images format and/or sampling and/or subsampling and/or resolution, wherein the configuration of the first camera and the second camera is kept fixed while conducting the method.

15. An arrangement for optical scanning of at least one object region placed on a transparent specimen holder, the arrangement comprising:
    a laser, generating a laser beam;
    a first camera,
    a second camera,
    wherein the first camera is configured to acquire plural first images of the laser beam reflected from each sample lateral position of plural predefined sample lateral positions,
    thereby determining a reference distance between the transparent specimen holder and an objective lens, at which reference distance the laser beam is substantially focused at and reflected from an upper surface of the specimen holder,
    wherein the determination of the reference distance comprises analyzing the plural first images and wherein the analyzing the plural first images comprises:
        detecting a first reflex of the laser beam at an upper surface of a cover glass covering the object region,
        detecting a second reflex of the laser beam at a lower surface of the cover glass, and
        detecting a third reflex of the laser beam at the upper surface of the specimen holder;
    wherein the second camera is configured for taking, for each sample lateral position, plural second images upon transmission flash illumination, to define a focus distance; and
    a processor is adapted to determine a focus distance topology across the object region based on the focus distances determined for all sample lateral positions.

16. The method according to claim 2,
    wherein the laser beam has wavelength between 600 nm and 900 nm to illuminate the object region at each sample lateral position,
    wherein the light returning from the object region comprises reflection from a dichroic filter or a dichroic reflector,
    wherein each of the plural first images is between 128× 128 pixels and 32×32 pixels, and
    wherein subsampling is applied while acquiring the plural first images.

17. The method according to claim 3,
    wherein between 2000 and 4000 first images per second are acquired while the objective lens is moving,
    wherein varying the distance further comprises supplying control signals from the first camera to a driver comprising a piezo drive, and
    wherein the driver is adapted to vertically move the objective lens.

18. The method according to claim 10,
    wherein the specimen holder is translated in meander shape,
    wherein the at least one of the third images is acquired while performing flash illumination having a duration between 0.5 µs and 20 µs,
    wherein the flash illumination is adapted to excite fluorescence in the object region, and
    wherein fluorescence emission radiation emanating from the object region is detected by the second camera or third camera.

19. The method according to claim 12,
    wherein acquiring the optical overview image uses an overview camera having a focal length between 5 mm and 10 mm and having a working distance of between 50 mm and 150 mm, and
    wherein defining the plural sample lateral positions comprises defining at least five sample lateral positions for focusing within the determined object region, and/or defining, based on the localization of the object region, mesh positions of a lateral two dimensional mesh, at which later the third images are acquired.

20. The arrangement according to claim 15, further comprising:
- a drive and measurement component for vertically moving the objective lens and
- a translation stage adapted to laterally move the specimen holder while acquiring third images and focusing according to the focus distance topology, using the drive and measurement component.

* * * * *